United States Patent

[11] 3,577,048

| [72] | Inventor | Tore Nordin |
| | | Vasteras, Sweden |
| [21] | Appl. No. | 787,182 |
| [22] | Filed | Dec. 26, 1968 |
| [45] | Patented | May 4, 1971 |
| [73] | Assignee | Allmanna Svenska Elektriska Aktiebolaget |
| | | Vasteras, Sweden |
| [32] | Priority | Dec. 27, 1967 |
| [33] | | Sweden |
| [31] | | 17793/67 |

[54] PLURAL MOTOR ANTISLIP DRIVE CONTROL
2 Claims, 1 Drawing Fig.

[52] U.S. Cl. .................................................. 318/52,
 318/71, 318/81
[51] Int. Cl. .................................................. B61c 15/08
[50] Field of Search .......................................... 318/52, 71,
 81

[56] References Cited
UNITED STATES PATENTS

| 2,716,209 | 8/1955 | Secarea .................... | 318/52 |
| 2,930,957 | 3/1960 | Cronberger ................ | 318/52 |
| 3,378,743 | 4/1968 | Weiser ...................... | 318/52 |

*Primary Examiner*—T. E. Lynch
*Attorney*—Jennings Bailey, Jr.

ABSTRACT: A driving system for an electric locomotive has a plurality of parallel-connected direct current motors each connected to a pair of wheels and connected by their armature windings to a variable alternating current source by a rectifier. Each motor has a field winding connected to a control current source to receive signals from the source to reduce the field. Each armature circuit feeds to a selection device a magnitude proportional to the armature current. The selection device selects the greatest of these magnitudes, which is compared with each of the magnitudes proportional to the armature current, which signal is then fed to the field winding. The control signal is maintained below a certain maximum value.

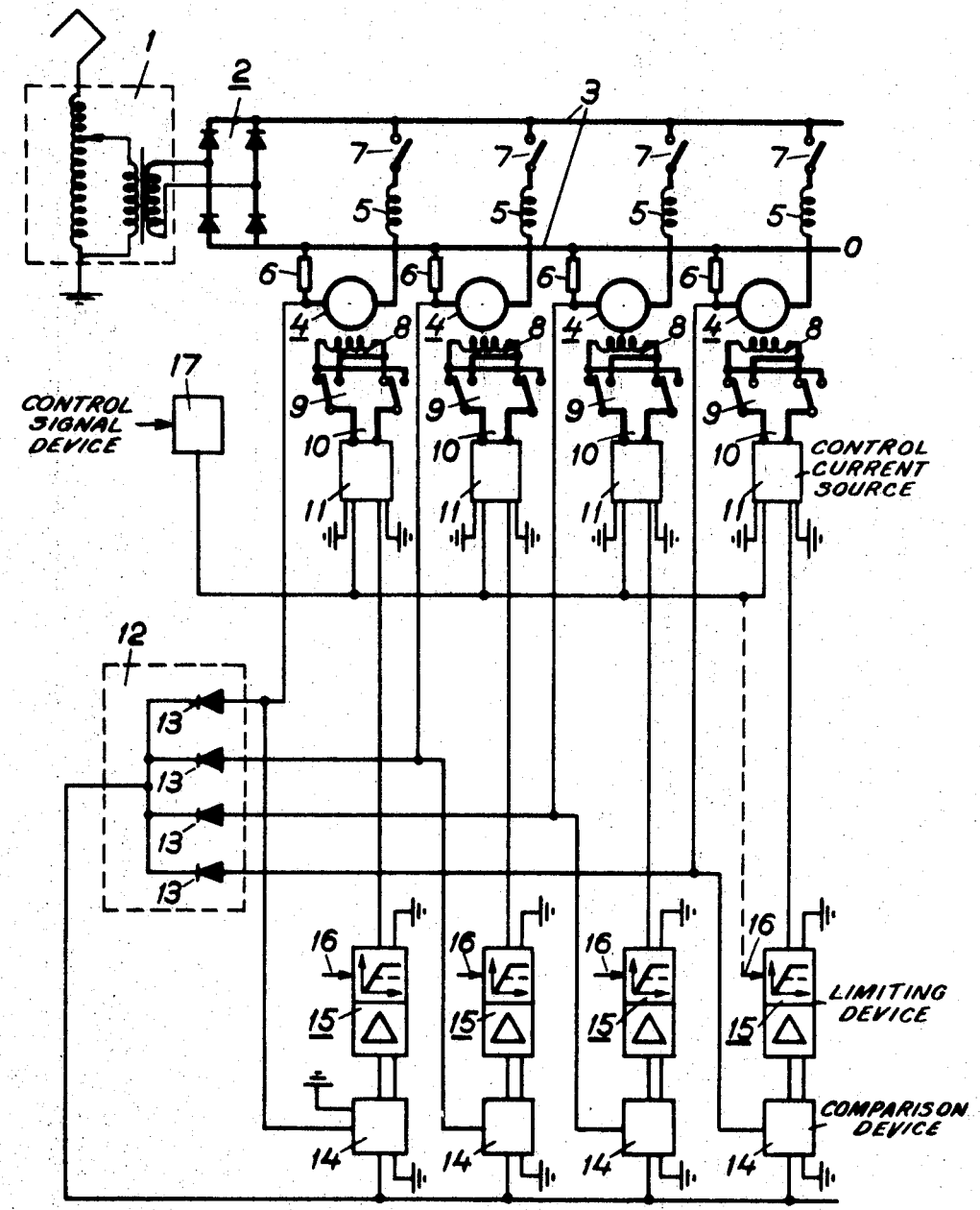

PLURAL MOTOR ANTISLIP DRIVE CONTROL

BACKGROUND OF THE INVENTION

1. Field of the Invention

The present invention relates to a driving system for an electric locomotive, which driving system comprises a plurality of parallel-connected direct current motors which are mechanically connected to one pair of wheels (or one group of wheel pairs) each and connected to a variable alternating current source by means of rectifier diodes.

2. The Prior Art

Several known locomotives of various makes are manufactured with such driving systems. In most cases the motors in the driving system are series motors since these, in contrast to separate or shunt-excited motors, provide an even load distribution. As is known, however, series motors have the disadvantage that the excitation is influenced directly by the armature current which means that the load reduction occurring during slipping produces an even greater tendency to slipping. With stepwise increase of the motor voltage the sudden increase in voltage increases the risk of slipping so that with the same adherence conditions it is impossible to achieve an adherence force similar to that which can be attained with stepless speed control.

In a known driving system for an electric locomotive with diesel-driven DC generator and DC motors distributed in two parallel groups connected to the generator, the intention has been to be able to regulate the speed of the locomotive within a wide range and at the same time avoid great deviations from optimum operation of the diesel motor. The DC motors are therefore made with separately excited field windings and the excitation current is delivered by two regulators controlled by the armature currents in such a way that uniform load distribution between said groups is effected. In this way the motors obtain the same satisfactory load distribution as series motors, but also the same characteristics from a slipping point of view. When the combination of separate excitation + field regulator is not motivated by the diesel operation as in the above described system, it has not been considered more advantageous than series motors, which is clear from the fact that all known driving systems of the type described in the introduction are made with series motors.

Since the appearance of thyristors on the market, stepless control of the motor voltage of rectifier locomotives has been possible by using a controlled rectifier, thus achieving a considerably better utilization of the adherence power range lying nearest the slipping limit. It is true that thyristors and their control equipment are considerably more expensive than corresponding diode locomotives, but the increased torsion power achieved, particularly under difficult adherence conditions, is so important that thyristor locomotives are often preferred to the considerably cheaper diode locomotives. By manufacturing the driving system for a diode locomotive according to the invention it is achieved that the difference in traction capacity in the two types of locomotives is substantially equalized, and the difference in cost is only influenced to a slight degree by the extra equipment required by an arrangement according to the invention.

SUMMARY OF THE INVENTION

The invention is based on the observation that the above-mentioned disadvantages connected with stepwise control are eliminated to a great extent if separately excited motors are used instead of series motors.

It is also clear that measures must be taken to ensure uniform load distribution between the parallel-connected motor groups or the motors. The latter requirement can of course be fulfilled by feeding the field windings from special load-distribution regulators in the same way as the diesel locomotive described in the introduction, but in this case a motor arrangement is again obtained having series characteristics. The factors have therefore been considered which normally give rise to uneven loading and investigations have been made as to the extent to which compensating steps must be taken. It has been found that variations in wheel diameter and/or magnetic circuits are the normal reasons why deloading of a motor occurs during parallel operation and that such variations can usually be compensated by correction of the motor field by at the most 10 percent.

According to the invention the equalizing effect of the load-distribution regulator is limited by means of a special arrangement so that the difference between the excitation current of two motors can never be greater than a certain value necessary for the required correction. Thus a racing which has commenced can never result in a field reduction which is greater than said value, which is normally very low, seldom more than 5 percent, so that the speed of the slipping motor is kept below a certain, relatively low limit value. If with stepwise control of the motor voltage one goes one stage further than the prevailing adherence conditions permit, the result is only a very moderate slipping which can be rapidly brought under control without drastic voltage reduction.

The invention relates to a driving system for an electric locomotive which driving system comprises a plurality of parallel-connected direct current motors which are mechanically connected to one pair of wheels each and connected by their armature windings to a variable alternating current source by means of rectifier diodes, each motor field being substantially independent of the armature current, and is characterized in that each motor has a field winding connected to a controlled current source which is furnished with input terminals for control signals to reduce the field and that each armature circuit contains a device for deriving a magnitude proportional to the armature current, the devices being connected by their output sides to a selection means for selection of the greatest of said magnitudes and that the magnitude thus selected is compared with each of the magnitudes proportional to the armature current in a corresponding number of comparison devices, each of which is connected by its input side to said selection means and one of said devices, and by its output side to said input terminals for control signals through a means for such limitation of said control signal that the field reduction is below a certain maximum value.

BRIEF DESCRIPTION OF THE DRAWINGS

In the following the invention will be described with reference to the accompanying schematic DRAWING which shows a driving system having four parallel-connected motors and their control system. With a view to making the drawing as clear as possible the connections between O potential and the various components of the control system are not shown.

DESCRIPTION OF THE PREFERRED EMBODIMENT

A stepwise variable alternating voltage is fed from the locomotive transformer 1 to the uncontrolled rectifier 2 built up of diodes, which is connected by its DC side to the DC bars 3 of the locomotive. Four separately excited DC machines 4 are connected to the bars 3 by their armature windings, reactors 5, resistors 6 and breakers 7 being connected in each of the armature circuits. The reactors are to smooth the pulsing direct current. The controlled current source shown in FIG. 1 of the patent is a motor-driven DC generator (RG) furnished with two field windings (RDF and RCF) connectable to different sources of magnetizing current. The field windings 8 of the motors are connected through switches 9 to alter the driving direction, to two output terminals 10 of individual controlled current sources 11 (which may be of the type shown in U.S. Pat. No. 2,417,784). The controlled current source 11 are dimensioned to provide full excitation power to the corresponding field windings. The control member shown in FIG. 1 of the patent is a motor-driven DC generator (E) with a shunt winding (EF) series-connected with a variable resistor (23) by means of which a desired output voltage can be set. Each of the current sources 11 is provided with two control circuits, one of which is connected to the control member 17

(which may be of the type shown in U.S. Pat. No. 2,417,784) by means of which a constant control signal, that is, one which is independent of the motor load, control signal is set, for example manually. If the motors have certain deviations in magnetic resistance, and so on and/or the wheels driven by different motors, for example due to uneven wear, have different diameters, the motors tend to have different armature currents. The control system then operates so that the motor having a tendency towards the greatest armature current is supplied with the number of ampere turns delivered by the controlled current source 11 when this is only controlled by the control magnitude supplied from the control member 17. Each of the other motors is also supplied with a counteracting control signal which, within a certain relatively low limit, is proportional to the deviation in armature current between the motor in question and said highest loaded motor, and which is limited to a value below said limit. This is done by supplying the voltages which are proportional to the armature currents of the four motors and acting across the resistors 6, to the selection device 12 where the highest voltage is selected with the help of the semiconductor diodes 13, and then comparing the selected voltage with each of said voltages in a comparison device 14 for each motor, the output side of each device 14 being connected to a corresponding limiting means 15 (which may be of the type shown in "Vacuum-Tube Circuits" by Arguimbau, 1954, page 537) which delivers a limited control magnitude to corresponding control circuits in the controlled current source 11. In this way the number of ampere turns of the field is reduced in the least loaded motors so that all the armature currents become equal. If one of the motors during slipping should be subjected to extreme deloading, the field current is not reduced to a corresponding degree, since the field reduction is always kept below the limit set by the limiting device 15. In a new locomotive it is sufficient for this limit to correspond to a reduction of, for example 4 percent of full field. With older locomotives and particularly when wheels are replaced at different times, the difference in diameter between old and new wheels is so great that it may be necessary to set said limit as high as, for example 15 percent of full field. It is thus important that this limit is adjustable as indicated by the arrows 16.

When the locomotive is to be driven with increased speed and reduced driving torque the motor field is debilitated by reduction of the control current from the control device 17. Since the value of control current delivered from the limiting means 16, and required for uniform load distribution can be reduced by such a field debilitation, it may be advantageous to arrange a connection between the devices 17 and 15, as indicated for the motor at the furthest right in the drawing, so that the decrease takes place automatically.

The driving system described in connection with the drawings comprises only one of many feasible embodiments of the invention. For example the motors may have two field windings, one of which is connected to the limit device 16 and provides a counteracting number of ampere turns. Such a solution, however, would incur increased manufacturing costs and decreased material utilization. Further, two controlled current sources would be required to feed one motor field instead of only one.

I claim:

1. Driving system for an electric locomotive, which driving system comprises a plurality of parallel-connected direct current motors which are mechanically connected to one pair of wheels each and connected by their armature windings to a variable alternating current source by means of rectifier diodes, each motor field being substantially independent of the armature current, a controlled current source, each motor having a field with input terminals connected to said controlled current source to receive control signals therefrom to reduce the field, each armature circuit containing means for deriving a magnitude proportional to the armature current, a selection means, said magnitude deriving means being connected by their output sides to said selection means for selection therein of the greatest of said magnitudes, a plurality of comparison means for comparing the magnitude selected by said selection means with each of the magnitudes proportional to the armature current first means connecting each of said comparing means by its input side to said selection means and one of said magnitude deriving means and second means connecting each of said comparing means by its output side to said field winding input terminals for one of said motors, and means in said second connecting means to limit the control signal to such a value that the field reduction is below a certain maximum value.

2. Driving system according to claim 1, in which said means for limiting the control signal to reduce the field is adjustable.